United States Patent [19]

Martins Leites et al.

[11] Patent Number: 5,230,148

[45] Date of Patent: Jul. 27, 1993

[54] METHOD FOR THE MANUFACTURE OF A COOLED ENGINE PISTON HEAD

[75] Inventors: Jose M. Martins Leites; Jose A. Cardoso Mendes; Andre Lippai, all of Sao Paulo, Brazil

[73] Assignee: Metal Leve S/A Industria E Comercio, Sao Paulo, Brazil

[21] Appl. No.: 688,147

[22] Filed: Apr. 19, 1991

[30] Foreign Application Priority Data

Apr. 20, 1990 [BR] Brazil .................. PI 9001916

[51] Int. Cl.⁵ ................................ B23P 15/10
[52] U.S. Cl. ............... 29/888.042; 29/888.044; 92/208
[58] Field of Search ............ 29/888.04, 888.044, 29/888.042. 428, 557; 92/216, 222, 224, 208, 231; 228/112, 113, 114; 123/193.6

[56] References Cited

U.S. PATENT DOCUMENTS

| 1,667.202 | 4/1928 | Ford | 29/888.042 |
| 2,478,179 | 8/1949 | Brockmeyer | 92/216 |
| 3,424,138 | 1/1969 | Dreisin | 92/216 |
| 4,377,967 | 3/1983 | Pelizzoni | 92/216 |
| 4,603,617 | 8/1987 | Barth et al. | 92/216 |
| 4,709,621 | 12/1987 | Matsui et al. | 29/888.042 |
| 4,727,795 | 12/1987 | Murray et al. | 92/216 |
| 4,847,964 | 7/1989 | Adams et al. | 29/888.042 |
| 4,941,397 | 7/1990 | Kawai et al. | 29/888.042 |

Primary Examiner—Irene Cuda
Attorney, Agent, or Firm—Darby & Darby

[57] ABSTRACT

A method for the manufacture of a cooled piston head in which the upper and lower portions of the piston head are made separately; a metal plate is placed on the lower side of the upper portion; the upper portion incorporating the metal plate is joined to the lower portion by friction welding. The metal plate is provided with a central hole for the passage of cooling oil onto the undercrown, and means of communication with a closed cooling chamber defined by a circumferential groove on the head upper portion and the peripheral outer surface of the metal plate.

9 Claims, 1 Drawing Sheet

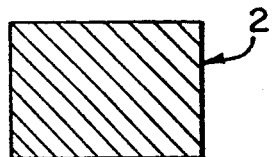
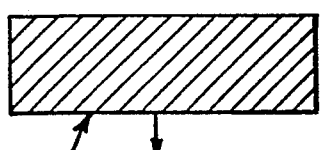
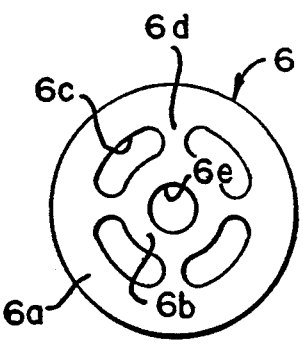
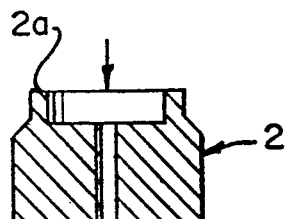
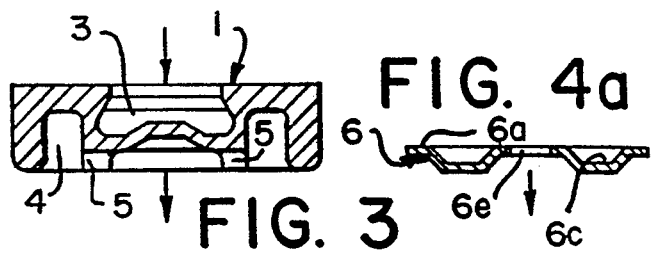
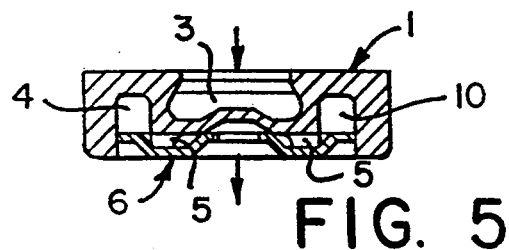
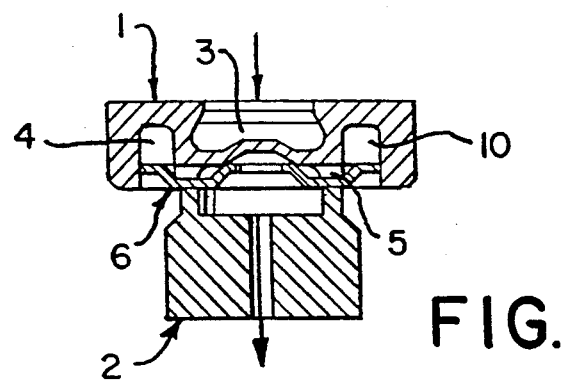
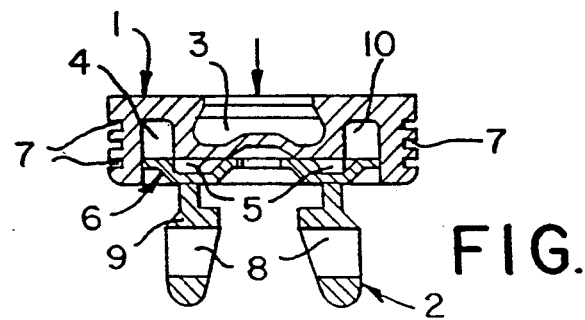

METHOD FOR THE MANUFACTURE OF A COOLED ENGINE PISTON HEAD

BACKGROUND OF THE INVENTION

The present invention relates to a method for the manufacture of a cooled piston for use in internal combustion engines. Particularly, the invention deals with a method to manufacture the upper part, or head of a two-piece, or articulated, piston provided with improved cooling means.

The main components, i.e. the head and the skirt, of articulated pistons are independent members. The head, composed of the top and the pin boss portions, is generally made of forged or cast steel, and the skirt is made of a lighter material, generally aluminum or an aluminum alloy. This type of piston is being adopted for diesel engines, especially last generation diesel engines, where combustion pressures and temperatures in the engine are very high. Owing to these conditions, which are extremely adverse to the piston head, it has been a common practice to provide the piston crown with a cooling chamber for the circulation of oil to remove part of the heat from at least two regions very susceptible to the influence of elevated temperatures: the ring band and the combustion bowl rim.

One traditional cooling chamber construction consists of providing a circumferential groove at the piston crown between the combustion bowl and the ring band, and a circumferential trough, or tray, on the skirt upper portion, whereby with the piston assembled the groove and the tray define a semi-open cooling chamber for the circulation of cooling oil.

While suitable for most applications, this type of chamber is not entirely satisfactory when a higher cooling efficiency is required. One disadvantage is a poor cooling of the undercrown, i.e. the region underneath the combustion bowl, which is not reached by the chamber cooling action. Another disadvantage arises from the construction itself of the semi-open chamber: part of the cooling oil flows from the tray on the skirt upper portion thereby reducing the quantity of oil in the chamber and, accordingly decreasing the cooling efficiency on the ring band and combustion bowl wall regions.

BRIEF DESCRIPTION OF THE INVENTION

With a view to solving this problem, the present invention has the objective of providing a method to manufacture an articulated piston head by which there is provided effective cooling means for all of the piston head portions most subjected to high temperatures, namely the ring band, the combustion bowl wall and the undercrown.

According to the method for the manufacture of an articulated piston head of the present invention, the two portions comprising the piston head, i.e. the top portion and the pin boss portion, are made separately, a cooling oil tray being installed on the top lower portion and thereafter the top portion incorporating the cooling oil tray being joined to the pin boss portion.

It is a further object of the present invention an articulated piston head provided with a closed cooling chamber incorporated to the head according to the method of the invention.

RELATED APPLICATION

Reference is made to U.S. Pat. No. 5,065,508 which was granted on Nov. 19, 1991 and issued to the assignee of the subject application. This patent relates to the method of making the head portion of the two piece piston in which two parts, i.e., the head and the pin boss portion, are fastened together.

BRIEF DESCRIPTION OF THE DRAWINGS

The invention will be hereinafter described in greater detail with reference to the accompanying drawing where:

FIG. 1 is a longitudinal sectional view of a blank from which the upper portion of the piston head of the invention will be made;

FIG. 2 is a longitudinal sectional view of a blank from which the lower portion of the piston head of the invention will be made;

FIG. 3 is a longitudinal sectional view of the upper portion of the piston head of the present invention made from the blank shown in FIG. 1;

FIG. 4 is a plan view of the tray which defines the bottom of the cooling chamber of the piston of the invention;

FIG. 4a is a cross sectional view of the tray depicted in FIG. 4;

FIG. 5 is a longitudinal section view of the upper portion of the piston head with the tray of FIG. 4 provided on the bottom of the upper portion according to the invention;

FIG. 6 is a longitudinal sectional view of the lower portion, or pin boss portion, of the piston head of the invention made from the blank of FIG. 2;

FIG. 7 is a longitudinal section view of the piston head of the invention showing the upper and lower portions joined together; and FIG. 8 is a longitudinal section view of the piston head of the invention showing the upper and lower portions machined to their final dimensions.

DETAILED DESCRIPTION OF THE INVENTION

According to a preferred embodiment of the invention, there is provided a blank i, preferably of steel and obtained by forging, continuous casting or sintering. The blank i is preferably a cylindrical body having a diameter as close as possible to that of the finished part, whereby it is possible to reduce machining operations which is beneficial to the final cost. The blank i is subjected to a first series of machining operations for the provision of an upper combustion bowl 3, a lower circumferential groove 4 and a recess underneath the combustion bowl 3, so as to define a plurality of semiperipheral oblong-shaped webs 5 angularly spaced apart from each other (FIG. 3).

Thereafter, a substantially circular plate 6, preferably of steel, is provided with a center hole 6e, a plurality of slots 6c spaced from each others by regions 6d, defining an outer peripheral surface 6a and an inner peripheral surface 6b, as shown in FIG. 4 and 4a. In the subsequent operation, the plate 6 is placed on the lower part of portion i by fitting the oblong shaped webs 5 of upper portion i into the slots 6c of plate 6. In this manner, the outer peripheral surface 6a is positioned such as to close the circumferential groove 4 defining with said groove 4 a closed chamber 10 (FIG. 5).

Thereafter, there is provided a blank 2, which may be of the same material of blank i and obtained by the same process, preferably having a cross section substantially similar to the shape of the pin bosses in their final form. Blank 2 is subjected to machining to provide a circumferential recess at one of its ends and a narrowing of its diameter around the recess thereby defining a circumferential web 2a. The blank 2 is then joined to blank i by means of the juxtaposition of the top face of the circumferential web 2a of blank 2 with the lower end of webs 5, the joining being carried out by welding, preferably by friction welding. The friction welding method is preferred for it performs the joining without causing the melting of the materials to be welded, thus preventing the occurrence of porosities which could impair the bonding strength. Upon the completion of the welding, plate 6 is firmly held in the piston head and the outer peripheral surface 6a closes the groove 4 to define a close chamber 10 for the cooling oil (FIG. 7). Finally, the head comprising top i and pin bosses 3 and incorporating plate 6 is subjected to the final machining operations for provision of the pin bosses 9, the pin holes 6 and the ring grooves 7.

The supply of the cooling oil to the chamber is made by means of a nozzle (not shown); the oil is injected through the central hole 6e of plate 6 and hits the undercrown, thus removing part of the heat generated in that region. Thereafter, a portion of the oil thus supplied returns to the engine crankcase through the same central hole 6e and the remaining oil flows toward chamber 10 through the regions 6d of plate 6. With the reciprocating motion of the piston, the oil confined in the chamber 10 is subjected to a cocktail shaker-like effect, thereby removing part of the heat from the combustion bowl wall and the ring region. The supply of oil is provided in a continuous cycle, thus at least part of the oil in the chamber is always fresh, which ensures an efficient cooling and the maintenance of optimum temperature conditions on the several portions of the piston head.

We claim:

1. A method for the manufacture of the head portion of a two-piece articulated cooled piston comprising the steps of:
   a) providing a first blank having a substantially cylindrical cross section;
   b) providing the lower part of said first blank with a lower circumferential groove, and a recess so as to define a plurality of webs spaced from each other;
   c) providing a substantially circular metal plate;
   d) providing said metal plate with a central hole, a plurality of slots at positions corresponding to the webs of said first blank; and
   e) placing said metal plate on the lower portion of said blank by fitting said webs into said slots to close the circumferential groove of said blank.

2. A method according to claim 1, further comprising the steps of:
   a) providing a second substantially cylindrical blank;
   b) providing a circumferential recess on one end of said second blank and narrowing said second blank around said circumferential recess to define a circumferential web;
   c) joining said first blank incorporating said metal plate with said second blank by the juxtaposition of said circumferential web upper face with the lower end of said first blank webs; and
   d) forming pin bosses and pin holes on the lower portion of said second blank.

3. The method according to claim 2, wherein the webs of said first blank are oblong and are angularly spaced from each other, and said slots of said metal plate are formed in a corresponding manner.

4. The method of claim 3 wherein said webs of said first piece and said slots of said metal plate are spaced such that the plate has an outer peripheral region which covers the circumferential groove on the lower part of said first piece.

5. The method of claim 2, wherein said first and second blanks are made of steel and are formed by forging, continuous casting or sintering.

6. The method of claim 5, wherein the joining of said first blank with said second blank is by welding.

7. The method of claim 2, wherein the joining of said first blank with said second blank is by friction welding.

8. The method of claim 1 further comprising the step of providing the upper part of the first blank with a combustion bowl, the recess on the lower part being below said combustion bowl.

9. The method of claim 1 wherein said webs of said first piece on said slots of said metal plate are spaced such that the plate has an outer peripheral region which covers the circumferential groove on the lower part of said first piece.

* * * * *